United States Patent [19]

Luksch

[11] Patent Number: 5,076,731
[45] Date of Patent: Dec. 31, 1991

[54] APPARATUS FOR BURSTING AN EXISTING PIPE AND WIDENING THE BORE THEREOF

[75] Inventor: Edmund Luksch, Heusenstamm, Fed. Rep. of Germany

[73] Assignee: Diga Die Gasheizung GmbH, Essen, Fed. Rep. of Germany

[21] Appl. No.: 501,145

[22] Filed: Mar. 29, 1990

[30] Foreign Application Priority Data

Mar. 30, 1989 [DE] Fed. Rep. of Germany ....... 3910354

[51] Int. Cl.⁵ .......................... F16L 1/00; F16L 54/18
[52] U.S. Cl. ...................................... 405/154; 138/97; 166/55; 405/184
[58] Field of Search .............. 405/154, 156, 184; 166/55, 55.1, 55.2, 55.3; 138/97; 30/92.5

[56] References Cited

U.S. PATENT DOCUMENTS

| | | | |
|---|---|---|---|
| 3,181,302 | 5/1965 | Lindsay | 405/156 |
| 4,634,313 | 1/1987 | Robbins | 405/154 X |
| 4,648,746 | 3/1987 | Abinett | 405/154 X |
| 4,674,914 | 6/1987 | Wayman et al. | 405/154 |
| 4,720,211 | 1/1988 | Streatfield et al. | 405/154 |
| 4,738,565 | 4/1988 | Streatfield et al. | 405/154 |
| 4,789,268 | 12/1988 | Yarnell | 405/154 |
| 4,981,181 | 1/1991 | Hesse | 405/154 X |
| 4,983,071 | 1/1991 | Fisk et al. | 405/154 |

*Primary Examiner*—Dennis L. Taylor
*Attorney, Agent, or Firm*—Blakely, Sokoloff, Taylor & Zafman

[57] ABSTRACT

The apparatus comprises a mole to be pulled through an existing pipe provided with a cone-shaped head portion for widening an existing pipe, a cutting arrangement with radially protruding blades in front of the effective head portion and a guidance portion having a cylindrical portion centered on the mole axis which precedes the cutting arrangement, the diameter of the cylindrical part being slightly smaller than the bore diameter of the existing pipe. For cutting along two lines parallel to the line of apparatus advance and for centering the apparatus in the existing pipe in the case of any usual utility line, a cable passes axially through the cylindrical portion of the apparatus and is fastened to the head portion of the mole. The guidance portion is loosely attached to the cone-shaped head portion and is axially moved through the existing pipe by the head portion and the cable.

8 Claims, 1 Drawing Sheet

APPARATUS FOR BURSTING AN EXISTING PIPE AND WIDENING THE BORE THEREOF

FIELD OF THE INVENTION

The present invention pertains to the laying of underground utility pipes and more particularly to an apparatus for bursting and widening the bore of existing pipes and the trenchless installation of new utility pipes in existing pipes so burst.

BACKGROUND OF THE INVENTION

Equipment for bursting existing pipes and widening the bore of the burst pipe by pressing the debris into the surrounding soil is used for the simple trenchless installation of utility pipes. Unlike the conventional cut-and-cover technique, the use of a trenchless method for the installation of new pipes minimizes disturbances and obstruction to traffic.

West German patent No. 3,800,869 divulges an apparatus for widening existing pipes wherein the head of an impact ramming device (hereinafter referred to as "mole") is provided with a blade and a support surface parallel to the longitudinal center line of said mole. Said support surface parallel to the longitudinal center line of said mole is to concentrate the force of the forward movement at one point for fracturing, said point being the location of the only blade with which said apparatus is provided.

To date, the fracturing of steel lines has posed particular difficulties. Conventional equipment has been fitted with rigidly attached blades which have been mounted on the cone-shaped portion of the mole or a separate cone-shaped body connected with the head of the mole. The diameter of the cone has conventionally been wider than the internal diameter of the pipe to be fractured. If pipes of relatively small diameter are fractured for the installation of new buried pipes, the mole may advance at a speed in excess of the speed at which the cable pulled by a winch moves forward, the cable hence loosing its tension. The guiding control of such a mole may thereupon be lost, the mole escaping from the bore of the existing pipe and damaging utility lines laid close to the existing pipe to be destroyed.

Another known apparatus for widening the bore of an existing pipe comprises a cutting face attached to the mole by a universal joint resisting tensile and compressive forces. The cable by which said apparatus is pulled is fastened to the body carrying the cutting face. Said arrangement cuts the line on two sides at the beginning of the cutting operation but the mole may relatively soon be displaced in the direction of the side offering the least resistance if the mole advances more rapidly than the cable is being pulled, only one side of the pipe thus being cut.

As the mole travels through a pipe section, it turns about its longitudinal axis. To prevent such turning from having a twisting effect on the cable by which the apparatus is being towed, it has to date been necessary to provide for an untwisting device. The blades carried by conventional moles have at least partially moved together with the mole, cuts in the steel pipe to be fractured thus taking a corkscrew-type appearance even if cutters engage with two opposite pipe walls, thereby obstructing the bore widening operation.

The effects described hereinbefore mainly occur when steel pipe is fractured (cut) and widened. Cast iron, asbestos, cement or PVC pipes may be broken more easily. Pipeline contractors must hence dispose of a multiplicity of special moles for steel pipe on the one hand and for pipes made from other material on the other hand, whereby the cost of trenchless utility line installation is substantially increased.

SUMMARY OF THE INVENTION

It is the object of the present invention substantially to overcome the disadvantages of the present state of the art described hereinabove and to provide for a technique which allows pipe cutting along at least two lines in the wall of the existing pipe substantially parallel to the pipe center line in the direction of mole advance and for the maintenance of mole centering in the pipe on substantially all usual utility lines.

The present invention provides for an apparatus to break and to widen the bore of existing buried pipes. Said apparatus comprises a mole having a vibrating cutting face which may be referred to as an impact ram. Said mole has a cone-shaped head portion to widen the existing pipe. Cutting means to fracture the existing pipe are arranged in front of said effective cone-shaped head portion and have at least two cutters provided with blades protruding radially outwardly. A guidance portion is movably attached to said cone-shaped head portion so that said guidance portion may tilt or swivel relative to said head portion in any direction. Said guidance portion carries said cutting means and has a cylindrical portion preceding said cutting means, said cylindrical portion having an outside diameter which is smaller than the internal diameter of the existing pipe to allow said cylindrical portion to be towed through said existing pipe prior to widening the bore thereof. A cable which may pull said mole through said existing pipe passes axially through said cylindrical portion of said guidance portion and is fastened to said head portion of said mole. The guidance portion is thence not towed directly by said pulling means, but is moved indirectly in an axial direction by said head portion and may hence guide the apparatus provided for by the present invention without any restriction or obstruction, centering the center line of said mole on the center line of the pipe to be fractured.

The guiding means preceding both the cutting arrangement and the ramming device centers the axis of mole advance on the center line of the existing pipe thereby ensuring multiple cutting thereof. Multiple cutting of the existing pipe by several parallel cuts keeps surfaces to be displaced relatively small. The guidance portion also guides the mole through the fractured or cut pipe, the mole substantially centered on the center line of the existing pipe displacing cut pipe segments into the surrounding soil similarly to conventional moles, an advantage being that the edges of the cut surfaces are not displaced further than the radius of the mole and hence do not represent a risk to other utility lines. It is an important advantage of the present invention that the same mole may be used to widen both steel pipe and cast iron pipe, making one mole universally usable for utility lines of practically any material. The present invention hence lowers substantially the cost of having equipment for the destruction of existing utility lines. In a preferred embodiment of the present invention, the blades of the cutting arrangement are unrotatably connected with the guidance portion of the apparatus as the existing pipe is being fractured and displaced, whereas the mole may rotate about its longitudinal axis without causing the cutting arrangement to rotate as the mole advances through the line to be fractured.

To assemble the apparatus provided for by the present invention, the cable to tow said apparatus is passed centrally through the cylindrical portion of the guidance portion thereof and attached to the head portion of the mole, the guidance portion being loosely placed upon said cone-shaped head portion. As the bore of the existing pipe is being widened, said guidance portion is moved axially by said head portion.

In an alternative embodiment of the present invention, the cable may be provided with tensioning means pretensioning the guidance portion axially relative to the cone-shaped head portion of the mole, said pretensioning means and said cable combining all components of the apparatus proposed by the present invention into one unit, thereby facilitating advantageously the handling of said apparatus and the insertion of said apparatus into the existing pipe.

Further advantages and details of the present invention will now be described by way of reference to a preferred embodiment of the invention.

BRIEF DESCRIPTION OF THE DRAWING

The accompanying drawing is a schematic side view of an embodiment of the present invention for fracturing existing pipes and widening the bore thereof.

DETAILED DESCRIPTION OF THE PRESENT INVENTION

Figure 1:
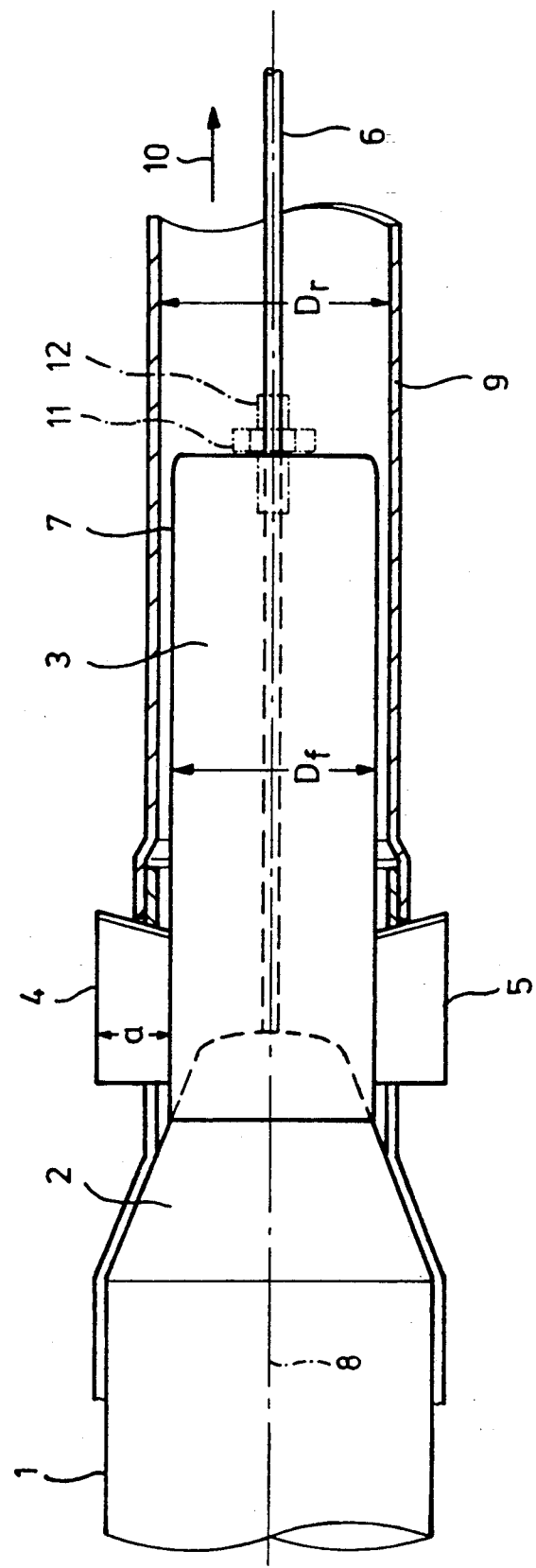

Referring to FIG. 1, the drawing depicts an embodiment of an improved apparatus for fracturing and widening the bore of existing pipes and more particularly steel pipes. Specific references will hereinafter be made to specific dimensions, blade numbers, blade arrangements and other details to facilitate the comprehension of the present invention, but anyone versed in the art will realize that the present invention may be used advantageously without adhering to such details. Known fittings, devices and mole drive means will on the other hand not be presented hereinafter in order not to make the description unnecessarily complex.

The apparatus depicted in FIG. 1 comprises a mole 1 having a cone-shaped head portion 2 to which a guidance portion 3 is axially attached, a cutting arrangement having two blades 4, 5 displaced relative to each other by an angle of 180° and a cable 6 connected with said head portion 2 of said mole 1 by means not depicted in FIG. 1. The guidance portion 3 is provided with a cylindrical portion 7 which is loosely attached to the cone-shaped head portion 2 of said mole 1 coaxially with the apparatus center line 8. The two blades 4, 5 are welded to the rear end of said guidance portion 3 and protrude radially outwardly from the surface area of the cylindrical portion 7. Said cylindrical portion 7 of said guidance portion 3 of the apparatus divulged herein is of an outside diameter $D_f$ which is slightly smaller than the internal diameter $D_r$ of the existing pipe 9 to be cut and displaced. The difference in diameter $b = D_r - D_f$ is preferably minimized to improve apparatus guidance by said guidance portion 3 on the center line of pipe 9. With the guidance portion 3 preceding the blade arrangement 4, 5, to prevent a deviation of said blade arrangement in any one direction due to different resistances to cutting at the point of engagement of blade 4 or blade 5 causing only blade 4 or blade 5 to be effective, each blade must protrude outwardly from the cylindrical portion 7 of said guidance portion 3 by a distance a exceeding the diameter difference b. (In FIG. 1, the apparatus with its guidance portion 3 is depicted exactly on the center line of the existing pipe 9, the distance between the surface of the cylindrical portion 7 and the internal pipe wall being 0.5 b at all points).

As FIG. 1 shows, both blades 4, 5 and mole 1 with its head portion 2 are substantially centered on the center line of the existing pipe 9 by the cylindrical portion 7 of the guidance portion 3, a lateral displacement or deviation of said blades 4, 5 and said mole 1 relative to said existing pipe 9 thereby being excluded. The cut produced by both blade 4 and blade 5 is hence always substantially parallel to the pipe center line independent of any rotational movement of mole 1 about its center line 8, no untwisting device thence being required. The guidance portion 3 is axially supported by an appropriate annular surface on the cone-shaped head portion 2 of the mole 1, said support causing said guidance portion to be moved in the direction of mole advance 10 by cable 6. The mole 1 displaces radially into the surrounding soil the debris of the pipe 9 cut along axes parallel to the pipe center line by blades 4, 5, the apparatus proposed by the present invention being in this regard similar to conventional moles used, for example, for fracturing existing cast iron pipes.

In the drawing, a nut 11 is depicted by a broken line, said nut 11 being on the end of the guidance portion 3 facing the direction of towing 10 and being suitable for fastening to a threaded bolt 12 integrated in cable 6. Said nut 11 may compress the guidance portion 3 with respect to the cone-shaped head portion 2 of mole 1 using the cable 6 passing through said guidance portion 3.

Embodiments of the present invention different from the embodiment described in detail hereinbefore may be proposed. The pair of blades described may, for example, be replaced by any larger number of blades preferably distributed equiangularly around the circumference of the cylindrical portion 7. The inclination of blades 4, 5 in the direction of arrow 10 depicted in FIG. 1 may equally be replaced by an inclination in the opposite direction or no inclination at all. The blades may alternatively be attached rigidly or even detachably to guidance portion 3 by any known method. If the blades 4, 5 are detachable, they may be replaced easily by new blades, the blades being exposed to particularly high wear.

What is claimed is:

1. An apparatus for bursting and widening the bore of existing buried pipes having substantially the same diameter said apparatus comprising:
    a mole suitable for being pulled through such an existing pipe, said mole having a center line and a cone-shaped head portion aligned relative to said center line, said head portion being effective to widen said existing pipe;
    at least two cutting blades for bursting said existing pipe, said cutting blades protruding substantially radially outwardly;
    a guidance portion being movably attached to said cone-shaped head portion and carrying said cutting blades, said guidance portion having a cylindrical portion preceding said cutting blades and, having an outside diameter which is smaller than the internal diameter of said existing pipe; and
    pulling means to tow said mole through said existing pipe, said pulling means passing substantially axially through said guidance portion and being fastened to said head portion of said mole, said guidance portion thereby being axially moved by said head portion to which said pulling means is fastened.

2. An apparatus according to claim 1 wherein said blades are welded equiangularly to the rear end of said guidance portion.

3. An apparatus according to claim 2 wherein said guidance portion is a hollow cylindrical sleeve.

4. An apparatus according to claim 3 wherein said guidance portion and said mole are rotatable relative to each other around said center line.

5. An apparatus according to claim 1 wherein said pulling means comprises a cable.

6. An apparatus for widening the bore of existing buried steel pipes, said apparatus comprising:
   a mole having a center line and a cone-shaped head portion aligned relative to said center line, said head portion being suitable to widen such an existing pipe;
   two cutting blades for bursting said existing pipe, said cutting blades protruding radially outwardly;
   a guidance portion being movably attached to said cone-shaped head portion and carrying said cutting blades, said guidance portion having a cylindrical portion preceding said cutting blades and having an outside diameter which is smaller than the internal diameter of said existing pipe;
   a cable to tow said mole through said existing pipe, said cable passing substantially axially through said guidance portion and being movably fastened to said head portion of said mole, the cable thence indirectly moving said guidance portion axially by moving said head portion to which said cable is fastened when said mole is being towed through said existing pipe.

7. An apparatus according to claim 6 further comprising means interacting with said cable to precompress said guidance portion relative to said head portion.

8. An apparatus according to claim 7 wherein said precompression means comprises a threaded bolt being fastened into a nut applying tension along said cable between said guidance portion and said head portion.

* * * * *